(12) United States Patent
Huang et al.

(10) Patent No.: US 10,348,550 B2
(45) Date of Patent: Jul. 9, 2019

(54) METHOD AND SYSTEM FOR PROCESSING NETWORK MEDIA INFORMATION

(71) Applicant: TENCENT TECHNOLOGY (SHENZHEN) COMPANY LIMITED, Shenzhen (CN)

(72) Inventors: Dongbo Huang, Shenzhen (CN); Zhenxiao Li, Shenzhen (CN); Ge Chen, Shenzhen (CN); Hongyu Zhao, Shenzhen (CN); Chaojian Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 442 days.

(21) Appl. No.: 15/173,184

(22) Filed: Jun. 3, 2016

(65) Prior Publication Data

US 2016/0285672 A1    Sep. 29, 2016

Related U.S. Application Data

(63) Continuation of application No. PCT/CN2015/072796, filed on Feb. 11, 2015.

(30) Foreign Application Priority Data

Feb. 11, 2014    (CN) .......................... 2014 1 0047134

(51) Int. Cl.
*H04L 12/24* (2006.01)
*G06F 16/435* (2019.01)
*G06F 16/9535* (2019.01)

(52) U.S. Cl.
CPC .......... *H04L 41/042* (2013.01); *G06F 16/435* (2019.01); *G06F 16/9535* (2019.01); *H04L 41/0823* (2013.01); *H04L 41/0866* (2013.01)

(58) Field of Classification Search
CPC .............. H04L 41/042; H04L 41/0823; H04L 41/0866; G06F 17/30029; G06F 17/30867
See application file for complete search history.

(56) References Cited

U.S. PATENT DOCUMENTS 9,161,084 B1 * 10/2015 Sharma .............. G06K 9/00778
9,183,557 B2 * 11/2015 Patwa .................... G06Q 30/00
(Continued)

FOREIGN PATENT DOCUMENTS

CN         101082972 A      12/2007
CN         102346899 A      2/2012
(Continued)

OTHER PUBLICATIONS

Zhe Gaoa and Qigang Gaoa. "Ad-Centric Model Discovery for Predicting Ads' Click-through Rate", The 4th International Conference on Ambient Systems, Networks and Technologies (ANT 2013), Procedia Computer Science 19 (2013) 155-162, 8 pages. (Year: 2013).*

(Continued)

*Primary Examiner* — George C Neurauter, Jr.
(74) *Attorney, Agent, or Firm* — Anova Law Group, PLLC

(57) ABSTRACT

A method and a system for processing network media information are provided. The method includes: collecting historical distribution effect data of network media information; performing attribute improvement processing on the historical distribution effect data by using population attribute data and network media information management data to obtain characteristic attribute data; constructing an effect parameter estimation model corresponding to each attribute of the characteristic attribute data, and training the effect parameter estimation model; estimating an effect parameter value of each audience for target network media information according to the effect parameter estimation model; and (Continued)

selecting an audience whose estimated effect parameter value is greater than or equal to a specified threshold value to form an audience population package to be extracted. The present invention can improve efficiency of extraction, reduce labor cost, and improve precision of distribution of network media information in an audience population package.

18 Claims, 5 Drawing Sheets

(56) References Cited

U.S. PATENT DOCUMENTS

| | | | | |
|---|---|---|---|---|
| 2001/0037321 | A1* | 11/2001 | Fishman | G06Q 10/04 705/500 |
| 2007/0027772 | A1* | 2/2007 | Chou | G06Q 30/02 705/14.54 |
| 2007/0156514 | A1* | 7/2007 | Wright | G06Q 30/02 705/14.41 |
| 2008/0004953 | A1 | 1/2008 | Ma et al. | |
| 2009/0287672 | A1* | 11/2009 | Chakrabarti | G06F 17/30864 |
| 2012/0023043 | A1* | 1/2012 | Cetin | G06N 7/005 706/12 |
| 2016/0225014 | A1* | 8/2016 | Mitra | G06Q 30/0244 |

FOREIGN PATENT DOCUMENTS

| | | |
|---|---|---|
| CN | 102904918 A | 1/2013 |
| CN | 202748836 U | 2/2013 |
| CN | 103220305 A | 7/2013 |

OTHER PUBLICATIONS

Avila Clemenshia P. and Vijaya M. S. "Click Through Rate Prediction for Display Advertisement", International Journal of Computer Applications (0975-8887), vol. 136—No. 1, Feb. 2016, 7 pages. (Year: 2016).*

The State Intellectual Property Office of the People's Republic of China (SIPO) Office Action 1 for 201410047134.9 dated Oct. 9, 2017 7 Pages (including translation).

The World Intellectual Property Organization (WIPO) International Search Report for PCT/CN2015/072796 dated Apr. 29, 2015.

* cited by examiner

METHOD AND SYSTEM FOR PROCESSING NETWORK MEDIA INFORMATION

This application is a continuation of PCT Application No. PCT/CN2015/072796, filed on Feb. 11, 2015, which claims priority to a Chinese patent application No. 201410047134.9 filed on Feb. 11, 2014, the content of all of which is incorporated herein by reference in its entirety.

FIELD OF THE TECHNOLOGY

The present disclosure generally relates to Internet data processing technologies, and in particular, relates to a method for processing network media information and a related system.

BACKGROUND OF THE DISCLOSURE

Network media information includes various types of information that is distributed on various presentation forms (for example, a webpage or a client interface) of an Internet system and is carried in digital code. Generally, network media information corresponds to a target webpage. A user can click on the network media information to jump to the corresponding target webpage, and content of the target webpage is presented to the user. How to effectively distribute and present network media information to a specific audience and effectively manage presented information is a field of focus in the current industry of Internet technologies.

Technologies of processing and presenting network media information have been developed very rapidly in recent years, and have already been applied to many industrial fields such as the field of processing and presenting Internet advertisements, where an Internet advertisement is a type of network media information. A major technology among the technologies of processing and presenting network media information is a technology of distributing and presenting network media information.

Currently, during the distribution of network media information, a network media information distributor has an increasingly high requirement on precision of distribution of network media information. Instead of a previous aimless and indiscriminate manner, an impression of network media information is expected to achieve efficient conveyance to an audience that has the greatest relevance to the network media information. A manner of distributing network media information also gradually changes from distribution of network media information at a specified position for network media information to distribution of network media information to a specified population. A network media information distributor hopes that network media information can be directly distributed to a target population.

In an existing system for distributing network media information including targeted distribution of network media information, the targeted distribution of network media information to a specified audience is achieved according to targeting dimensions such as audience statistics, information content, audience behaviors, or the like. A distributor submits a distribution request, which is also referred to as an order, to the distribution system, where the distribution request includes network media information to be distributed and a targeting dimension, where the targeting dimension may be, for example, information such as a gender of an audience, an age of an audience, a region of an audience, time of presentation, a scenario of presentation, content of presentation, frequency of presentation, creative information of presentation, and redirection. When an audience sends a presentation request (for example, a request for presenting a webpage, a video, a client, or the like), a system for distributing and presenting network media information acquires dimension information in the sent presentation request, for example, a slot, a region, a presentation position, an age and a gender of an audience, and the like, then matches the dimension information with targeting dimension, submitted by the distributor, of network media information, and presents, according to a match result at a corresponding presentation position, network media information that correspondingly matches the presentation request. In this way, precise targeted distribution of network media information is achieved.

Further, in a current system for distributing network media information including targeted distribution of network media information according to an audience population package, relatively precise distribution of network media information can be achieved. The audience population package is an audience population set, extracted according to analysis of audience behaviors, of network media information. Generally, categorization and extraction are performed according to industrial classification and life stages to obtain, for example, a game population, an electronic commerce population, an automobile population, or a newly married population. A network media information distributor may select a corresponding audience population package as needed, and distribute network media information to an audience in the audience population package in a targeted manner. In this way, a click-through rate and a conversion rate of the network media information are improved. In addition, the distributor is only required to select a corresponding audience population package in a management system of the system for distributing network media information, and therefore, the operational step is simple, and the technology is very convenient and practicable for a network media information distributor.

However, a technical solution for extracting an audience population package in the prior art has the following disadvantages:

(1) In an existing solution for extracting an audience population package, a label classification method is usually used. A characteristic label that a target population package should have is first obtained through analysis and sorting, and a population set having a corresponding characteristic is then extracted from a total impression audience population according to the characteristic label and is used as an audience population package. Label selection in this extraction manner is easily susceptible to subjective influence of a person that performs extraction and in addition, influence of a data source, resulting in that accuracy and completeness of label classification of audience population are not high. Therefore, an extracted audience population package cannot greatly increase precision of distribution of network media information, and precision of targeted distribution of network media information through selection of an audience population package is even lower than precision of targeted distribution of network media information through selection of an audience population package.

(2) In a current solution for extracting an audience population package, an excessively amount of manual involvement is required, which consumes a large amount of time and labor, resulting in low efficiency of extraction and also low extensibility. Every step among decision to generate an audience population package, determination of a characteristic label of the audience population package, and development of a program to extract a population having a corresponding characteristic from an audience population requires manual follow-up by a specified person, and needs repeated tests and adjustments. This series of processes consumes a large amount of labor and time.

As such, convention methods of extracting an audience population package for network media information have low efficiency of extraction, a high labor cost, and undesirable precision of distribution of network media information in the audience population package.

SUMMARY

In view of the above, an objective of the present disclosure is to provide a method for extracting an audience population package for network media information and a corresponding system, so as to improve efficiency of extracting an audience population package, reduce a labor cost, and improve precision of distribution of network media information in an audience population package.

The technical solutions of the present disclosure are implemented as follows.

A method for processing network media information includes:

collecting historical distribution effect data of network media information;

acquiring population attribute data and network media information management data, and performing attribute improvement processing on the historical distribution effect data by using the population attribute data and the network media information management data to obtain characteristic attribute data;

constructing an effect parameter estimation model corresponding to each attribute of the characteristic attribute data, and training the effect parameter estimation model according to historical data;

estimating an effect parameter value of each audience for target network media information according to the effect parameter estimation model; and selecting, from the audiences, an audience whose estimated effect parameter value is greater than or equal to a specified threshold value to form an audience population package to be extracted.

A system for processing network media information includes:

a collection apparatus, configured to collect historical distribution effect data of network media information;

an attribute improvement apparatus, configured to acquire population attribute data and network media information management data, and perform attribute improvement processing on the historical distribution effect data by using the population attribute data and the network media information management data to obtain characteristic attribute data;

an estimation model apparatus, configured to construct an effect parameter estimation model corresponding to each attribute of the characteristic attribute data, and train the effect parameter estimation model according to historical data;

an effect parameter estimation apparatus, configured to estimate an effect parameter value of each audience for target network media information according to the effect parameter estimation model; and an extraction apparatus, configured to sequentially select, from the audiences, an audience whose estimated effect parameter value is greater than or equal to a specified threshold value to form an audience population package to be extracted.

In the present disclosure, characteristic attribute data is obtained on the basis of historical distribution effect data, an effect parameter estimation model of each attribute is constructed, a weight coefficient of each attribute in the estimation model is obtained after the estimation model is trained according to historical data, an effect parameter of each audience for target network media information input by an administrator is estimated according to the estimation model, and an audience population package that ranks high is extracted according to the estimated effect parameter. Therefore, in the present disclosure, extraction of a target population package is achieved by using a method based on an effect parameter (for example, click-through rate estimation and conversion rate estimation); an administrator is only required to input an industrial classification label, and can acquire other data from an existing system. In the present disclosure, an estimated effect (e.g., a click-through rate or a conversion rate) of each audience of network media information for target network media information can be automatically computed by using the data, where different scores represent levels of interest of a user in this type of network media information, and the scores are arranged in a descending order, and a population that ranks high is extracted and output as a target audience population package. The whole process requires little manual involvement, and can achieve automation of extraction of a population package, which improves efficiency of extraction and reduces a labor cost. Meanwhile, in the solution of the present disclosure, an effect parameter estimation model is used to compute an effect parameter value, for example, a click probability, of each audience for a type of network media information (this type of network media information is distinguished by an industrial classification label input by an administrator), and the effect parameter value is used as a basis for selecting a target population package. In this way, a click-through rate and a conversion rate of an audience after distribution of network media information are greatly enhanced, and precision of distribution of network media information in an audience population package is improved.

DESCRIPTION OF EMBODIMENTS

The following describes the present disclosure in further detail with reference to the accompanying drawings and specific embodiments.

Figure 1:
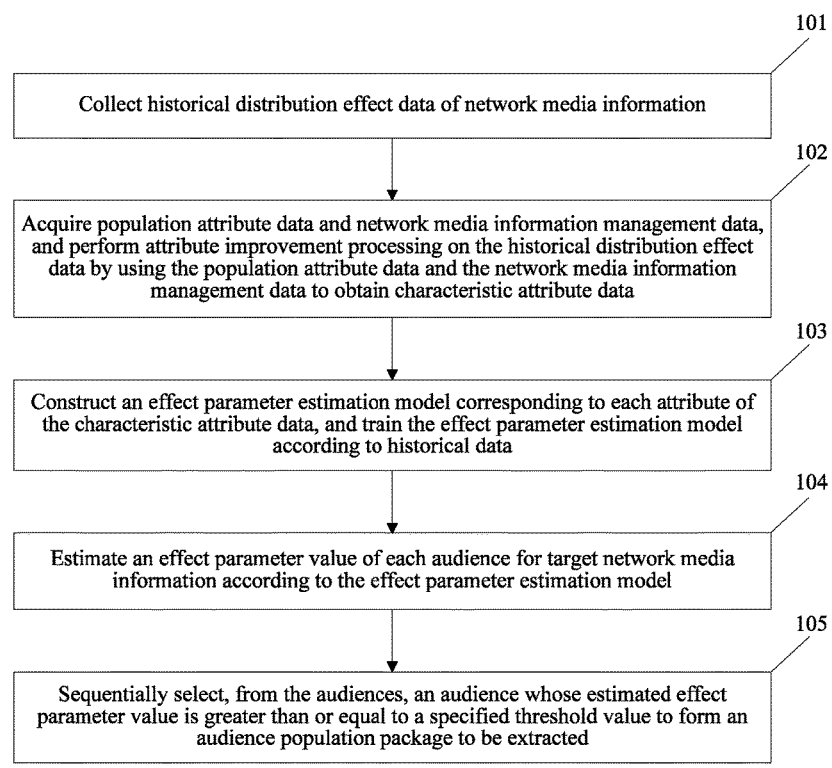
FIG. 1 is a flowchart of a method for processing network media information according to various embodiments of the present disclosure.

FIG. 1 is a flowchart of a method for processing network media information according to various embodiments of the present disclosure. The method for processing network media information according to the present disclosure may also be referred to as a method for extracting an audience population package for network media information. Referring to FIG. 1, the method mainly includes:

Step 101: Collect historical distribution effect data of network media information.

The historical distribution effect data is obtained according to historical reaction data of an audience population for distribution of network media information, and is existing data and can be directly obtained from an existing system for distributing network media information. The distribution effect data is, for example, impression data, click data, or conversion data, and may specifically include various field information such as an impression site, an identifier of network media information, a position identifier of a network media information, time, jump information (for example, from which webpage a webpage in which network media information is located jumps, also referred to as reference information in the industry), distributor information of network media information, and an identifier of each audience.

In this step, the collected distribution effect data may further be processed, for example, by performing cleaning and noise reduction processing. The cleaning and noise reduction processing includes, for example, deletion of erroneous data such as an ineffective impression, and repetition removal processing of repeated data.

Step 102: Acquire population attribute data and network media information management data, and perform attribute improvement processing on the distribution effect data by using the population attribute data and the network media information management data to obtain characteristic attribute data.

Specifically, the population attribute data may be acquired from an existing population attribute system, and the population attribute data specifically includes, for example, a user ID, an IP address, a gender, a region, an age segment, and an interest label.

The network media information management data may be acquired from an existing presentation location of network media information and a distribution request management system, and specifically includes, for example, an ID of a presentation position of network media information, description of a presentation position, a label of network media information, and distribution request information (for example, a distribution order of network media information is a distribution request).

Various attribute fields in each log in the distribution effect data are often incomplete and only include a key attribute field; however, a related attribute field directly affects precision of subsequent model training and computation of effect data in the present disclosure. Therefore, attribute improvement processing needs to be performed on the distribution effect data, and specifically includes: searching the population attribute data and the network media information management data according to a key attribute field in the distribution effect data to obtain a corresponding related attribute field, adding the related attribute field to the distribution effect data corresponding to the key attribute field, and forming the key attribute field and the related attribute field into the characteristic attribute data.

For example, an impression log of network media information only includes key attribute fields such as an ID of an impression audience and an ID of a presentation position of the current network media information, so that related attribute fields such as a gender of the audience, a region to which the audience belongs, an age segment, and an interest label can be found from the population attribute data, and related attribute fields such as description of a presentation position, a label, and distribution request information of the network media information can be found from the network media information management data; the related attribute fields are added to the impression log, so that the key attribute fields and the related attribute fields form the characteristic attribute data. After performing attribute improvement processing on a large amount of distribution effect data, relatively complete characteristic attribute data can be obtained, which can greatly improve precision of subsequent model training and computation of effect data.

Certainly, in addition to the population attribute data and the network media information management data, in the present disclosure, corresponding attribute improvement processing may also be performed on the distribution effect data by using other available related data. Richer obtained related data ensures more desirable improvement processing and higher precision of subsequent model training and computation of effect data.

Step 103: Construct an effect parameter estimation model corresponding to each attribute of the characteristic attribute data, and train the effect parameter estimation model according to historical data, so as to obtain a weight coefficient of each attribute in the effect parameter estimation model.

Specifically, this step specifically includes: constructing a logistic regression model of each attribute of the characteristic attribute data in a logistic regression manner, where the logistic regression model is referred to as the effect parameter estimation model in the present disclosure; and performing model training on the logistic regression model according to the historical distribution effect data in an impression log of the network media information, so as to obtain the weight coefficient of each attribute.

The logistic regression is an algorithm commonly used in the industry, and many Internet companies to solve large-scale machine learning of tens of billions of characteristics by using logistic regression. Regression refers to evaluation and solution seeking of an unknown parameter in a known formula, and regression is classified into linear regression and nonlinear regression. First, if a formula, for example, f(x, y, z)=a*x+b*y+c*z+d, is known, where a, b, c, and d are parameters to be evaluated; this is a linear regression problem, for example, a linear equation with a number of N variables is a linear regression problem. Parameter evaluation of a nonlinear equation is a nonlinear regression problem. The logistic regression is linear regression normalized by a logistic equation, and a form of the logistic equation is:

$$g(z) = \frac{1}{1+e^{-z}},$$

where z is the linear regression equation f(x, y, z) mentioned above. A probability value of whether an event occurs can be obtained by using the logistic equation, and is an effect parameter in the present disclosure.

In the present disclosure, the logistic regression model of each attribute of the characteristic attribute data is constructed in a logistic regression manner, and the logistic regression model is used as the effect parameter estimation model, where the logistic regression model specifically includes:

a regression part complying with formula (1):

$$f(x_1, x_2, x_3, \ldots, x_i) = a_1 * x_1 + a_2 * x_2 + a_3 * x_3 + \ldots + a_i * x_i + d \quad (1)$$

a logical part complying with formula (2):

$$g(z) = \frac{1}{1+e^{-z}} \quad (2)$$

where $z=f(x_1, x_2, x_3, \ldots, x_i)$, $x_1, x_2, x_3, \ldots, x_i$ are attributes in the characteristic data, $x_i$ is an ith attribute, $a_1, a_2, a_3, \ldots, a_i$ are weight coefficients corresponding to the attributes, $a_i$ is a weight coefficient corresponding to $x_i$, and $g(z)$ is a corresponding effect parameter.

In a specific embodiment of the present invention, the effect parameter may be, for example, a click-through rate or a conversion rate.

The click-through rate refers to a ratio of the number of times content on a webpage is clicked to the number of times the content is displayed, and is a percentage. The click-through rate reflects the degree of attention drawn to certain content on a webpage, and is often used to measure an attraction degree of network media information.

The conversion rate refers to a ratio of the number of times a conversion behavior is completed to the total number of times presented network media information is clicked in one statistical cycle. The conversion behavior refers to that an audience who visits a website completes, on the website, a task assigned by an information distributor. For example, the following behaviors are the conversion behaviors:

1. Stay on a website for a certain time.
2. Browse a specific page on a website, for example, a registration page or a "contact us" page.
3. Register or submit an order on a website.
4. Make inquiries by leaving a message on a website or by using an online instant messaging tool on a website.
5. Make an actual payment and conclude a transaction (especially for a website such as an electronic commerce website).

In a preferred embodiment in this specification, an example in which the effect parameter is a click-through rate is used as an example for description purposes.

In Step 103, the training the effect parameter estimation model according to historical data to obtain a weight coefficient of each attribute in the effect parameter estimation model specifically includes:

collecting each attribute combination involved in network media information impression data and an effect parameter corresponding to each attribute combination;

substituting an attribute in each attribute combination into the right side of the equals sign of formula (1) in the foregoing, where if the attribute $x_i$ appears in the attribute combination, the value of $x_i$ is 1, or if the attribute $x_i$ does not appear in the attribute combination, the value of $x_i$ is 0; substituting the effect parameter (for example, a click-through rate) corresponding to the attribute combination in formula (2) to obtain z, where $z=f(x_1, x_2, x_3, \ldots, x_i)$; and substituting $f(x_1, x_2, x_3, \ldots, x_i)$ into formula (1) to obtain logistic regression training of the attribute combination and the corresponding effect parameter; and solving $a_1, a_2, a_3, \ldots, a_i$ in formula (1) by using logistic regression training obtained for each attribute combination, so as to obtain the weight coefficient of each attribute in the effect parameter estimation model.

In a specific preferred embodiment, attributes of the characteristic attribute data include, for example, a series of attributes such as the gender of male and the age of 20, where the attributes are equivalent to $x_1, x_2, x_3, \ldots, x_i$ in formula (1) in the foregoing, and the value of each attribute is 0 or 1. If an attribute appears in an impression log of network media information, the attribute is 1; or if the attribute does not appear, the attribute is 0. The attribute herein may also be a combined attribute, for example, the gender of male+the age of 20 is a new attribute; therefore, the weight coefficient parameters $a_1, a_2, a_3, \ldots, a_i$ corresponding to the attributes reach a scale of tens of millions or even hundreds of millions in the present disclosure. The process of model training is a process of solving $a_1, a_2, a_3, \ldots, a_i$ by using the currently known effect data.

For example, if the effect data is the click-through rate, statistics is collected on an attribute involved in each network media information impression and whether the impression generates a click (where if the effect parameter is the conversion rate, and statistics is collected on whether a conversion is generated herein) herein. If a click is generated, it is determined as a positive example, or otherwise, it is determined as a negative example. Based on this, statistics are collected on click-through rates corresponding to various attribute combinations. An attribute combination is substituted into the right side of the equals sign of formula (1) in the foregoing, where if the attribute $x_i$ appears in the attribute combination, the value of $x_i$ is 1, or if the attribute $x_i$ does not appear in the attribute combination, the value of $x_i$ is 0. A click-through rate corresponding to the attribute combination is substituted into formula (2) to obtain z, where $z=f(x_1, x_2, x_3, \ldots, x_i)$; and $f(x_1, x_2, x_3, \ldots, x_i)$ is also substituted into formula (1) to obtain logistic regression training of one attribute combination and a corresponding click-through rate.

Accordingly, in the present disclosure, the obtained large amount of network media information impression data may be substituted into formula (1) and formula (2) in the foregoing to obtain a large amount of logistic regression training, the large amount of logistic regression training can sufficiently cover every attribute, and the weight coefficients $a_1, a_2, a_3, \ldots, a_i$ corresponding to all the attributes can be finally solved, where for example, a gradient descent method, may be used as a specific solving method.

The foregoing solving process is a process that consumes a lot of computing resources; and in a current example of data amount, 50 to 80 iterations on approximately 1.5 T of attribute data are required to calculate these weight coefficients. Therefore, in the present disclosure, computation of the model training may be performed by using a computer cluster.

After model training is completed, the weight coefficients such as values $a_1, a_2, a_3, \ldots, a_i$ corresponding to the attributes can be obtained.

Step 104: Estimate an effect parameter value (for example, a click-through rate is used as an example for description herein, and the effect parameter may also be a conversion rate or the like) of each audience for target network media information according to the effect parameter estimation model; sort the audiences according to the estimated effect parameter values (for example, estimated click-through rates), where for example, sorting may be performed in a descending order herein, and an audience with a higher score ranks higher, and is also a population that has a higher level of interest in and a higher probability to click on the target network media information.

The target network media information refers to a specific type of network media information corresponding to an extracted audience population package, where the network media information is usually distinguished by an industrial classification label. In the present disclosure, to specify the target network media information, an industrial classification label needs to be received, the target network media information is network media information correspondingly obtained by classification according to the received industrial classification label, and an audience population package to be extracted is an audience population package corresponding to the network media information corresponding to the industrial classification label.

The receiving an industrial classification label is specifically: receiving an industrial classification label input by an administrator by using an input interface. The industrial classification label is a label generated by a label classification system for existing network media information. The label classification system for existing network media information may perform classification and analysis on an industry to which network media information belongs, categorize the industries in a sequence from coarse granularity to fine granularity, and attach a corresponding classification label to an industry of each category. For example, a transportation category label, an entertainment category label, a game category label, a real estate category label, and the like may be obtained by classification; each category label may further be classified into subcategory labels, for example, the transportation category label may further be classified into an automobile category label and an aircraft category label, and the automobile category label may further be classified into a low-quality automobile label, an medium-quality automobile label, a high-quality automobile label, and the like.

In the present disclosure, industrial classification labels generated by the existing label classification system for network media information may be directly used, and the industrial classification labels are presented to the administrator for selection by the administrator. After making selection, the administrator may input a selected industrial classification label by using an input interface (for example, selecting from a category label presentation interface by using a mouse and clicking on an OK button to input the label), and in the present disclosure, the industrial classification label selected by the administrator can be received from the input interface.

In Step 104, the estimating an effect parameter value of each audience for target network media information is specifically estimating an effect parameter value, for example, a click-through rate, of each audience in an audience population in a specified range (for example, nationwide), which specifically includes:

receiving an industrial classification label, the weight coefficient of each attribute of the characteristic attribute data, and the population attribute data; and selecting the audience population in the specified range from the population attribute data, where for example, in an embodiment, all audiences may be selected, then each selected audience is sequentially traversed, and for each audience, a click-through rate of target network media information is estimated for the audience.

A specific estimation method herein is: substituting the computed weight coefficient of each attribute in the effect parameter estimation model into formula (1) in the foregoing; then determining whether each attribute in the attributes $x_1, x_2, x_3, \ldots, x_i$ appears in attributes of the audience and attributes of the target network media information, where if yes, the value of the attribute is 1, or otherwise, the value of the attribute is 0; substituting the value of each attribute into formula (1) to obtain corresponding $f(x_1, x_2, x_3, \ldots, x_i)=z$; and substituting z into formula (2), where an obtained g(z) is a probability value between 0 and 1, that is, a predicted effect parameter value of the audience for the target network media information in the present disclosure is, for example, a click-through rate in this embodiment.

Step 105: Sequentially select, from audiences that are arranged in a descending order of the estimated effect parameter values (where the effect parameter values are, for example, click-through rates), an audience whose estimated effect parameter value is greater than or equal to a specified threshold value (for example, a specified click-through rate) to form an audience population package to be extracted, and output the audience population package.

The specified threshold value, for example, a specified click-through rate, may be a click-through rate set by the administrator, and may also be a click-through rate obtained after increasing an average click-through rate of a specified quantity of users (for example, nationwide or local audiences) for the target network media information within a specified time range (for example, about a month); for example, an increase rate may be set to be 15%, and then the specified click-through rate is the average click-through rate multiplied by (1+15%).

In a preferred embodiment, a person quantity lower limit of the audience population package may also be set in the present disclosure. The selecting an audience whose estimated click-through rate is greater than or equal to the specified threshold value specifically includes: selecting, starting from an audience whose estimated click-through rate is the highest, from audiences arranged in a descending order of estimated click-through rates; adding the audience to the audience population package when the estimated click-through rate of the audience is greater than or equal to the specified click-through rate; and outputting the audience population package when the estimated click-through rate of the audience is less than the specified click-through rate, or a person quantity of the audience population package reaches the person quantity lower limit of the audience population package.

Because there is a huge quantity of audiences, sequentially determining whether a click-through rate of each audience is greater than or equal to the specified click-through rate results in a huge computation amount; therefore, in a further preferred embodiment of the present invention, starting from an audience whose estimated click-through rate is the highest, for every specified person quantity (for example, 1000 persons in the case of 10 million persons in total), an average click-through rate of all users that are from audiences arranged in a descending order of estimated click-through rates and rank higher than a selected user may be computed. The average click-through rate of the specified quantity of persons may be compared with the specified click-through rate; an audience of the specified person quantity is added to the audience population package if the average click-through rate of the specified quantity of persons is greater than or equal to the specified click-through rate; the audience population package is output when an average click-through rate of a specified quantity of persons is less than the specified click-through rate, or a person quantity of the audience population package reaches the person quantity lower limit of the audience population package.

It can be seen from the foregoing embodiment that for the size of the output population package in the present disclosure, there are two important principles: one is that an average click-through rate of the output population package must be greater than the specified click-through rate, and the other is that a larger output population package is better, which ensures that sufficiently many impressions are generated. In a preferred embodiment, based on that a click-through rate is increased to some extent, a relatively large population package is selected as much as possible for outputting.

In a further preferred embodiment, the specified click-through rate may also be a sum of an average click-through rate of a specified quantity of users (for example, nationwide audiences) for the target network media information within a specified time range (for example, about a month) and a specified increase amount. For example, an increase rate may be set to be 15%, and then the specified click-through rate is the average click-through rate multiplied by (1+15%).

Accordingly, in this embodiment, an offline effect test further needs to be performed, that is, a previous average click-through rate is computed according to offline distribution effect data (for example, an impression log); the average click-through rate is increased by a specified increase rate, where the increase rate may be set by the administrator or a distributor; the size of a population which is among the audiences arranged in the descending order of the estimated click-through rates and relative to the increased average click-through rate is then determined.

Specifically, the present disclosure further includes: acquiring historical effect data (for example, an impression log) of a specified quantity of users (for example, nationwide audiences herein) for the target network media information within a specified time range, and computing an average effect parameter (for example, an average click-through rate herein) of the specified quantity of users for the target network media information within the specified time range.

An audience whose click-through rate is greater than or equal to the specified click-through rate is selected from audiences that are sorted according to click-through rates and within a specified range, where the specified click-through rate is equal to the average click-through rate multiplied by (1+a specified increase rate), and the specified increase rate, for example, 15%, may be set by the administrator.

For example, an impression click log, within several days, of the target network media information may be used as test data herein to perform an effect examination on sorted populations and compute an increase, of an actual click-through rate of a population that ranks high, relative to an average click-through rate of all impression users.

An increase degree of a population package, as a configurable option, is selected by a population package administrator; the population package administrator may specify a minimum extent to which a population effect is increased (for example, a click-through rate is increased by 15%) or a minimum size (for example, 30 million) of the population package; and a system generates a corresponding population package according to a customized requirement of the administrator. If the administrator intends to generate a very desirable effect and is insensitive to the size of the population package, this value may be adjusted greater, or otherwise, if the administrator wants the population package to be as large as possible, this value may be configured and adjusted less.

In a further embodiment, in the present disclosure, a trend diagram of an average click-through rate of every specified quantity of persons may further be drawn according to a sorting result of the click-through rates to obtain a trend diagram of click-through rates of populations in an ascending sorting order. If a click-through rate estimation model is effective, an average click-through rate decreases as a population ranks higher. In an initial scenario, the administrator may set, according to the trend diagram, a reasonable extent to which a click-through rate is increased and a reasonable person quantity lower limit of the audience population package, so as to determine a cut-off point and the size of the output audience population package.

According to the effect increase trend in the foregoing step, a population that has a proper size and ranks high is selected and output as the audience population package. Therefore, for selection of the size of the output population package, the following two important principles may be followed: (1) an average click-through rate of the output population package is greater than an average click-through rate of all the users, where an increase degree is usually above 10%; and (2) a larger output audience population package is better, which ensures that sufficiently many impressions are generated.

By using the present disclosure, an audience population package can be mined and extracted by using an effect parameter estimation model. Compared with the prior art, the present disclosure has the following advantages:

(1) A procedure of extracting an audience population package is simplified, and automatic mining of a population package is basically implemented, thereby greatly reducing manual involvement, saving a large amount of labor, and increasing efficiency of mining an audience population package. By using the solution of the present disclosure, a population package can be automatically extracted and output as long as a population package administrator inputs data such as an industrial classification label and a specified threshold value (for example, an extent to which a click-through rate is increased); therefore, compared with a previous cumbersome procedure of extracting a population package, efficiency is increased by several times.

(2) A distribution effect of an audience population package is improved, and a network media information system becomes more attractive to a network media information distributor. Because the new method for extracting an audience population package is based on an effect parameter estimation model, such as a click-through rate estimation model, a click-through rate and a conversion rate of an extracted population is higher than those of a population outside the population package. An experiment proves that an increase of an average click-through rate varies in different industries, and an increase proportion is between 20% and 200%, which further verifies the desirable effect of the solution for extracting an audience population package in the present disclosure.

(3) In the present disclosure, a parameter estimation model such as a click-through rate (conversion rate) estimation model is introduced to the population extraction solution, and an effect-based population extraction method is implemented. However, in the prior art, click-through rate estimation is for predicting click-through rates for different network media information and selecting, according to the predicted click-through rates, network media information most suitable for playback. In the solution of the present disclosure, a click probability of all users for a type of network media information (where this type of network media information is distinguished by an industrial classification label input by the administrator) is computed by using the click-through rate estimation model, where the click probability is used as a basis for selecting a target population package. In this way, a click-through rate and a conversion rate of an audience after distribution of network media information are greatly enhanced, and precision of distribution of network media information in an audience population package is improved.

An extracted audience population package may be submitted to a distribution control system for network media information, and the distribution control system may select, from audience population packages extracted by a system for extracting an audience population package, an audience population package matching an industrial label in a distribution request, and distribute, to an audience in the audience population package, network media information of which distribution is requested in the distribution request.

The solution of the present disclosure is applicable to a system for targeted distribution of network media information among various network media information on the Internet by using a population package, and an extraction manner and a use method for a population package.

Figure 2:
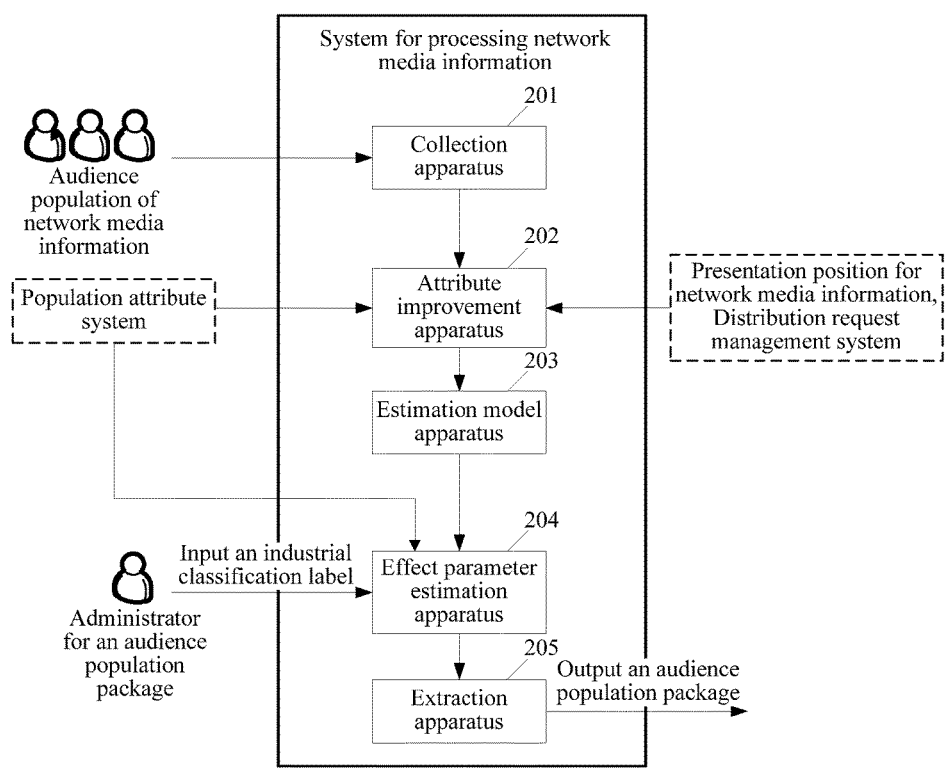
FIG. 2 is a schematic composition diagram of a system for processing network media information according to various embodiments of the present disclosure.

Corresponding to the foregoing method, the present disclosure further discloses a system for processing network media information. FIG. 2 is a schematic composition diagram of the system for processing network media information. Referring to FIG. 2, the system includes:

a collection apparatus 201, configured to collect historical distribution effect data of network media information, where the historical distribution effect data is obtained according to historical reaction data of an audience population of the network media information for distribution of the network media information;

an attribute improvement apparatus 202, configured to acquire population attribute data from a population attribute system and network media information management data from a presentation position for network media information and a distribution request management system, and perform attribute improvement processing on the historical distribution effect data by using the population attribute data and the network media information management data to obtain characteristic attribute data;

an estimation model apparatus 203, configured to construct an effect parameter estimation model corresponding to each attribute of the characteristic attribute data, and train the effect parameter estimation model according to historical data;

an effect parameter estimation apparatus 204, configured to estimate an effect parameter value of each audience for target network media information according to the effect parameter estimation model; and sort the audiences according to the estimated effect parameter values, for example, in a descending order herein, where an effect parameter may be, for example, a click-through rate or a conversion rate; and an extraction apparatus 205, configured to sequentially select, from the audiences arranged in a descending order, an audience whose estimated effect parameter value is greater than or equal to a specified threshold value to form an audience population package to be extracted.

In a preferred embodiment, the effect parameter estimation apparatus 204 is further configured to receive an industrial classification label, and the target network media information is network media information correspondingly obtained by performing classification according to the received industrial classification label.

In a preferred embodiment, the collection apparatus 201 is further configured to perform, after collecting the historical distribution effect data of the network media information, cleaning and noise reduction processing on the collected distribution effect data, and then send the collected distribution effect data to the attribute improvement apparatus for the attribute improvement processing.

In a preferred embodiment, the attribute improvement apparatus 202 is specifically configured to search the population attribute data and the network media information management data according to a key attribute field in the distribution effect data to obtain a corresponding related attribute field, add the related attribute field to the distribution effect data corresponding to the key attribute field, and form the key attribute field and the related attribute field into the characteristic attribute data.

In a preferred embodiment, the estimation model apparatus 203 is specifically configured to:

construct a logistic regression model of each attribute of the characteristic attribute data by using logistic regression, and use the logistic regression model as the effect parameter estimation model, where the logistic regression model specifically includes:

a regression part complying with formula (1):

$$f(x_1, x_2, x_3, \ldots, x_i) = a_1 {}^* x_1 + a_2 {}^* x_2 + a_3 {}^* x_3 + \ldots + a_i {}^* x_i + d \quad (1)$$

a logical part complying with formula (2):

$$g(z) = \frac{1}{1 + e^{-z}} \quad (2)$$

where $z = f(x_1, x_2, x_3, \ldots, x_i)$, $x_1, x_2, x_3, \ldots, x_i$ are attributes in the characteristic data, $x_i$ is an ith attribute, $a_1, a_2, a_3, \ldots, a_i$ are weight coefficients corresponding to the attributes, $a_i$ is a weight coefficient corresponding to $x_i$, and $g(z)$ is a corresponding effect parameter;

collect each attribute combination involved in network media information impression data and an effect parameter corresponding to each attribute combination;

substitute an attribute in each attribute combination into the right side of the equals sign of formula (1) in the foregoing, where if the attribute $x_i$ appears in the attribute combination, the value of $x_i$ is 1, or if the attribute $x_i$ does not appear in the attribute combination, the value of $x_i$ is 0; substitute the effect parameter (for example, a click-through rate) corresponding to the attribute combination into formula (2) to obtain z, where $z = f(x_1, x_2, x_3, \ldots, x_i)$; and substitute $f(x_1, x_2, x_3, \ldots, x_i)$ into formula (1) to obtain logistic regression training of the attribute combination and the corresponding effect parameter; and solve $a_1, a_2, a_3, \ldots, a_i$ in formula (1) by using logistic regression training obtained for each attribute combination, so as to obtain the weight coefficient of each attribute in the effect parameter estimation model.

In a preferred embodiment, the effect parameter estimation apparatus 204 is specifically configured to:

perform the following operations on each audience within a specified range:

substitute the weight coefficient of each attribute in the effect parameter estimation model into formula (1) in the foregoing; then determine whether each attribute in the attributes $x_1, x_2, x_3, \ldots, x_i$ appears in an attribute of the audience and an attribute of the target network media information, where if yes, the value of the attribute is 1, or otherwise, the value of the attribute is 0; substitute the value of each attribute into formula (1) to obtain corresponding $f(x_1, x_2, x_3, \ldots, x_i) = z$; and substitute z into formula (2), where an obtained $g(z)$ is an effect parameter value of the audience for the target network media information.

In a preferred embodiment, the extraction apparatus 205 is specifically configured to select, starting from an audience whose estimated effect parameter value is the highest, from audiences arranged in a descending order of estimated effect parameter values; add the audience to the audience population package when the estimated effect parameter value of the audience is greater than or equal to the specified threshold value; and output the audience population package when the estimated effect parameter value of the audience is less than the specified threshold value, or a person quantity of the audience population package reaches a preset person quantity lower limit of the audience population package.

In another preferred embodiment, the extraction apparatus 205 is specifically configured to compute, starting from an audience whose estimated effect parameter value is the highest, for every specified person quantity, an average effect parameter value of all users that are from audiences arranged in a descending order of estimated effect parameter values and rank higher than a selected user; compare the average effect parameter value of the specified quantity of persons with the specified threshold value; add an audience of the specified person quantity to the audience population package if the average effect parameter value of the specified quantity of persons is greater than or equal to the specified threshold value; and output the audience population package when an average effect parameter value of a specified quantity of persons is less than the specified threshold value, or a person quantity of the audience population package reaches a person quantity lower limit of the audience population package.

Figure 3:
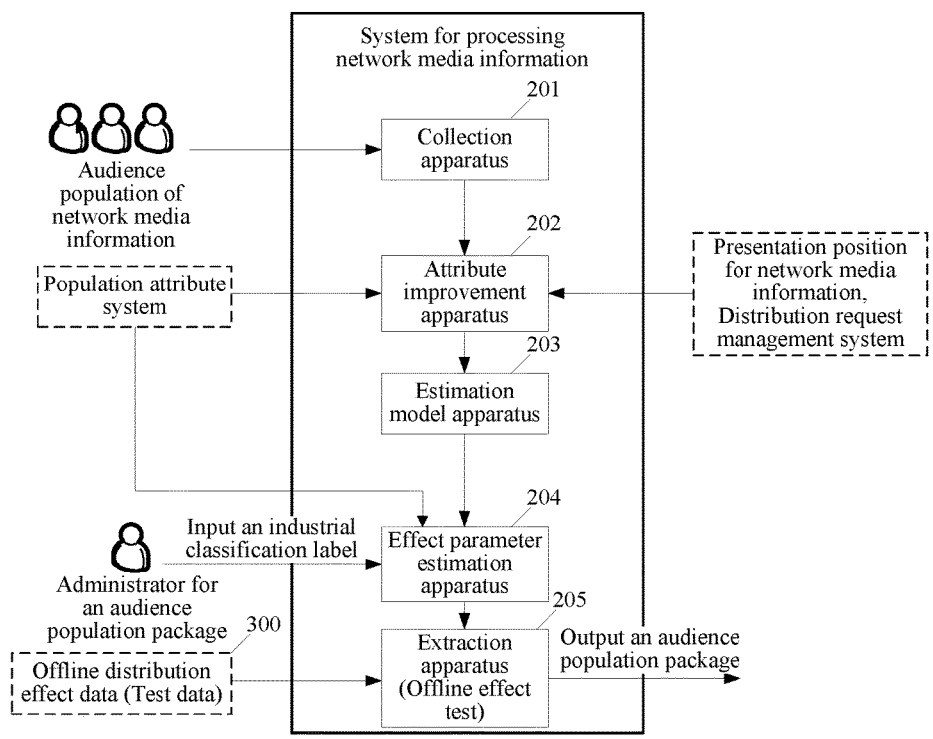
FIG. 3 is another schematic composition diagram of a system for processing network media information according to various embodiments of the present disclosure.

In a preferred embodiment, the specified threshold value is a sum of an average effect parameter value of a specified quantity of audiences for the target network media information within a specified time range and a specified increase amount. FIG. 3 is another schematic composition diagram of the system for processing network media information according to the present disclosure. Referring to FIG. 3, in this embodiment, to acquire an average effect parameter value of a specified quantity of audiences for the target network media information within a specified time range, offline distribution effect data 300 (for example, an impression log) needs to be accessed and be used as test data to compute a previous average click-through rate; the average click-through rate is increased by a specified increase rate, where the increase rate may be set by the administrator or a distributor; the size of a population which is among audiences arranged in a descending order of estimated click-through rates and relative to the increased average click-through rate is then determined. This process functions as an offline effect test.

Specifically, the extraction apparatus 205 is further configured to acquire historical effect data (for example, an impression log) of a specified quantity of users (for example, nationwide audiences herein) for the target network media information within a specified time range, compute an average effect parameter (for example, an average click-through rate herein) of the specified quantity of users for the target network media information within the specified time range, and select an audience whose click-through rate is greater than or equal to the specified click-through rate from audiences that are sorted according to click-through rates and within a specified range, where the specified click-through rate is equal to the average click-through rate multiplied by (1+a specified increase rate).

For example, an impression click log, within several days, of the target network media information may be used as test data herein to perform an effect examination on sorted populations and compute an increase, of an actual click-through rate of a population that ranks high, relative to an average click-through rate of all impression users.

Figure 4:
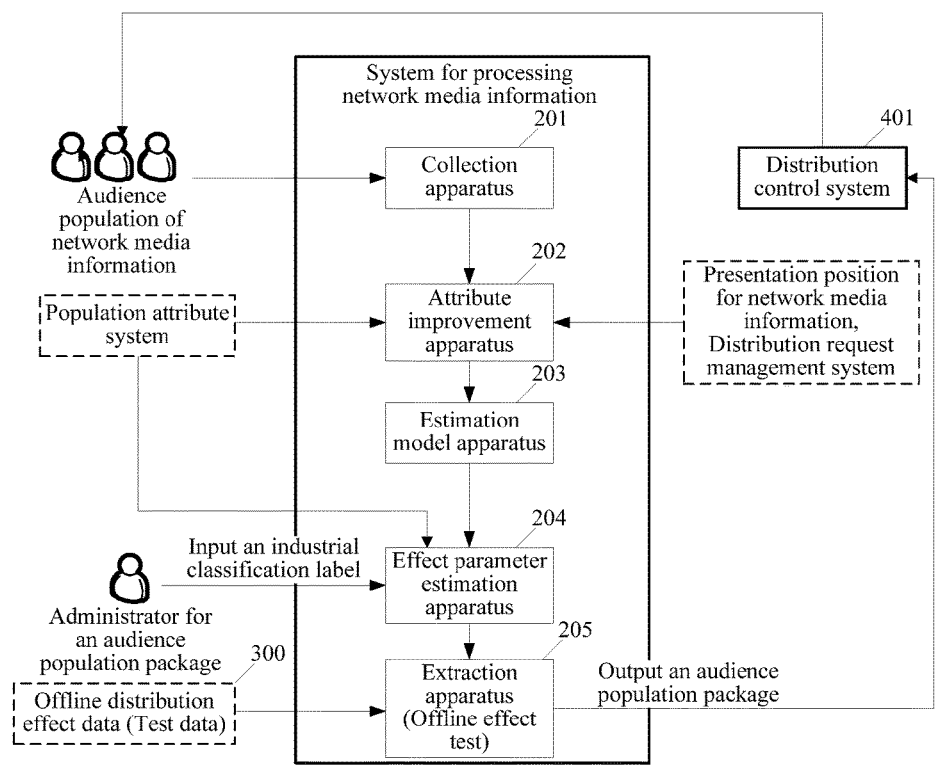
FIG. 4 is a schematic composition diagram of a system for distributing network media information according to various embodiments of the present disclosure.

Correspondingly, the present disclosure further discloses a system for distributing network media information. FIG. 4 is a schematic composition diagram of the system for distributing network media information. Referring to FIG. 4, the system for distributing network media information includes the foregoing system for extracting an audience population package for network media information, according to any one of the embodiments of the extraction system, and a distribution control system 401.

The distribution control system 401 is configured to select, from audience population packages extracted by the processing system, an audience population package matching an industrial label in a distribution request, and distribute, to an audience in the audience population package, network media information of which distribution is requested in the distribution request.

The technology for extracting an audience population package for network media information in the present disclosure is applicable to many industrial fields, for example, applicable to the fields of processing and presenting Internet advertisements, where an Internet advertisement may be regarded as a type of network media information.

In addition, functional modules in the embodiments of the present invention may be integrated into one processing unit, or each of the modules may exist alone physically, or two or more modules are integrated into one unit. The integrated unit may be implemented in a form of hardware, and/or may be implemented in a form of a software functional unit. The functional modules in the embodiments may be located in one terminal or network node, or may be distributed on multiple terminals or network nodes.

In addition, each embodiment of the present invention may be implemented by a data processing program that is executed by a data processing device such as a computer or any suitable computing system. Apparently, the data processing program constitutes the present disclosure. In addition, generally a data processing program stored in a storage medium is executed by directly reading the program from the storage medium or by installing or copying the program to a storage device (such as a hard disk and/or memory) of a data processing device. Therefore, such a storage medium also constitutes the present disclosure. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

For example, the disclosed methods can be implemented by device(s) (e.g., data processing device), terminal(s), and/or server(s) each including one or more processors, and a non-transitory computer-readable storage medium (e.g., as the storage device) having programs/instructions stored thereon. The programs/instructions can be executed by the one or more processors to implement the methods disclosed herein. In some cases, the programs/instructions may include one or more modules corresponding to the disclosed methods.

Figure 5:
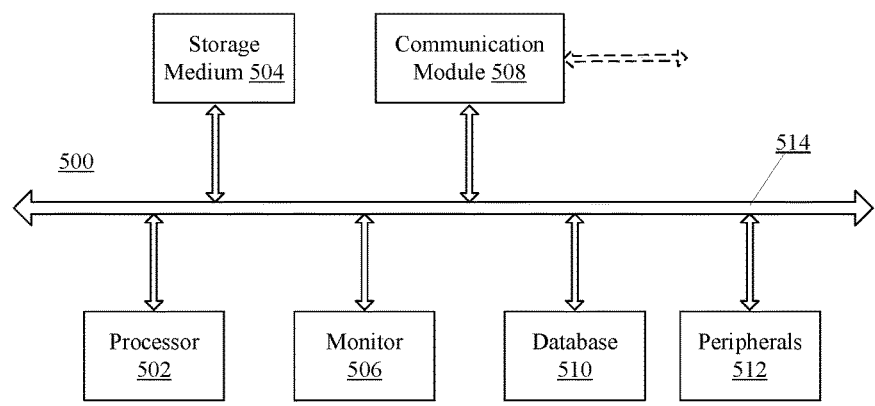
FIG. 5 illustrates an exemplary computing system according to various embodiments of the present disclosure.

In various embodiments, the disclosed device(s), terminal(s), server(s), and/or various modules/units may be implemented using one or more computing systems. FIG. 5 illustrates an exemplary computing system.

As shown in FIG. 5, a computing system 500 may include a processor 502, a storage medium 504 or a storage device, a monitor 506, a communication module 508, a database 510, peripherals 512, and one or more bus 514 to couple the devices together. Certain devices may be omitted and other devices may be included.

Processor 502 can include any appropriate processor or processors. Further, processor 502 can include multiple cores for multi-thread or parallel processing. Storage medium 504 may include memory modules, such as ROM, RAM, and flash memory modules, and mass storages, such as CD-ROM, U-disk, removable hard disk, etc. Storage medium 504 may store computer programs for implementing various processes, when executed by processor 502.

Further, peripherals 512 may include I/O devices such as keyboard and mouse, and communication module 508 may include network devices for establishing connections through a communication network. Database 510 may include one or more databases for storing certain data and for performing certain operations on the stored data, such as webpage browsing, database searching, etc.

The processor(s) 502 can upload executable files corresponding to processes of one or more programs/instructions to the storage medium 504, such as a non-transitory storage medium. The processor(s) 502 can then be used to run these one or more programs stored on the storage medium 504. For example, the processor(s) 502 can cause the exemplary device to perform the disclosed methods.

Therefore, the present disclosure further discloses a storage medium, having a data processing program stored therein, the data processing program being used to perform any one of the embodiments of the method in the present disclosure.

The foregoing descriptions are merely preferred embodiments of the present invention, but are not intended to limit the present invention. Any modification, equivalent replacement, or improvement made within the spirit and principle the present disclosure shall fall within the protection scope the present disclosure.

What is claimed is:

1. A method for processing network media information, comprising:
    collecting, by a server, historical distribution effect data of network media information;
    acquiring, by the server, population attribute data and network media information management data, and performing attribute improvement processing on the historical distribution effect data by using the population attribute data and the network media information management data to obtain characteristic attribute data;
    constructing, by the server, an effect parameter estimation model corresponding to each attribute of the characteristic attribute data, and training the effect parameter estimation model according to the historical distribution effect data;
    estimating, by the server, an effect parameter value of each audience for target network media information according to the effect parameter estimation model; and
    selecting, by the server, from the audiences, an audience whose estimated effect parameter value is greater than or equal to a specified threshold value to form an audience population package to be extracted, such that by automatically computing the estimated effect parameter value, the audience population package is automatically extracted without manual adjustment and precision of distribution of the network media information in the audience population package is improved.

2. The method according to claim 1, wherein the target network media information is network media information correspondingly obtained by performing classification according to a received industrial classification label.

3. The method according to claim 1, wherein the performing attribute improvement processing on the historical distribution effect data by using the population attribute data and the network media information management data to obtain characteristic attribute data specifically comprises:
    searching the population attribute data and the network media information management data according to a key attribute field in the distribution effect data to obtain a corresponding related attribute field, adding the related attribute fields to the distribution effect data corresponding to the key attribute field, and forming the key attribute field and the related attribute field into the characteristic attribute data.

4. The method according to claim 1, wherein the constructing an effect parameter estimation model corresponding to each attribute of the characteristic attribute data specifically comprises:
    constructing a logistic regression model of each attribute of the characteristic attribute data by using logistic regression, and using the logistic regression model as the effect parameter estimation model, wherein the logistic regression model specifically comprises:
    a regression part complying with formula (1):

$$z = f(x_1, x_2, x_3, \ldots, x_i) = a_1 {}^* x_1 + a_2 {}^* x_2 + a_3 {}^* x_3 + \ldots + a_i {}^* x_i + d \tag{1}$$

a logical part complying with formula (2):

$$g(z) = \frac{1}{1 + e^{-z}} \tag{2}$$

wherein $z = f(x_1, x_2, x_3, \ldots, x_i)$, $x_1, x_2, x_3, \ldots, x_i$ are attributes in the characteristic data, $x_i$ is an $i^{th}$ attribute, $a_1, a_2, a_3, \ldots, a_i$ are weight coefficients corresponding to the attributes, $a_i$ is a weight coefficient corresponding to $x_i$, $g(z)$ is a corresponding effect parameter, and d is a parameter to be evaluated.

5. The method according to claim 4, wherein the training the effect parameter estimation model according to historical data specifically comprises:
    collecting each attribute combination involved in network media information impression data and an effect parameter corresponding to each attribute combination;
    substituting an attribute in each attribute combination into the right side of the equals sign of formula (1) in the foregoing, wherein if the attribute $x_i$ appears in the attribute combination, the value of $x_i$ is 1, or if the attribute $x_i$ does not appear in the attribute combination, the value of $x_i$ is 0; substituting the effect parameter corresponding to the attribute combination into formula (2) to obtain z, wherein $z = f(x_1, x_2, x_3, \ldots, x_i)$; and substituting $f(x_1, x_2, x_3, \ldots, x_i)$ into formula (1) to obtain logistic regression training of the attribute combination and the corresponding effect parameter; and
    solving $a_1, a_2, a_3, \ldots, a_i$ in formula (1) by using logistic regression training obtained for each attribute combination, so as to obtain the weight coefficient of each attribute in the effect parameter estimation model.

6. The method according to claim 4, wherein the estimating an effect parameter value of each audience for target network media information specifically comprises:
    performing the following operations on each audience in a specified range:
    substituting the weight coefficient of each attribute in the effect parameter estimation model into formula (1) in the foregoing; then determining whether each attribute in the attributes $x_1, x_2, x_3, \ldots, x_i$ appears in an attribute of the audience and an attribute of the target network media information, wherein if yes, the value of the attribute is 1, or otherwise, the value of the attribute is 0; substituting the value of each attribute into formula (1) to obtain corresponding $f(x_1, x_2, x_3, \ldots, x_i) = z$; and substituting z into formula (2), wherein an obtained $g(z)$ is an effect parameter value of the audience for the target network media information.

7. The method according to claim 1, further comprising:
    setting, by the server, a person quantity lower limit of the audience population package; and the selecting an audience whose estimated effect parameter value is greater than or equal to a specified threshold value specifically comprising:

selecting, by the server, by starting from an audience whose estimated effect parameter value is the highest, from audiences arranged in a descending order of estimated effect parameter values;

adding, by the server, the audience to the audience population package when the estimated effect parameter value of the audience is greater than or equal to the specified threshold value; and outputting, by the server, the audience population package when the estimated effect parameter value of the audience is less than the specified threshold value, or a person quantity of the audience population package reaches the person quantity lower limit of the audience population package.

8. The method according to claim 1, further comprising:

setting, by the server, a person quantity lower limit of the audience population package; and the selecting an audience whose estimated effect parameter value is greater than or equal to a specified threshold value specifically comprising:

computing, by the server, starting from an audience whose estimated effect parameter value is the highest, for every specified person quantity, an average effect parameter value of all users that are from audiences arranged in a descending order of estimated effect parameter values and rank higher than a selected user;

comparing, by the server, the average effect parameter value of the specified quantity of persons with the specified threshold value; adding an audience of the specified person quantity to the audience population package if the average effect parameter value of the specified quantity of persons is greater than or equal to the specified threshold value; and outputting, by the server, the audience population package when an average effect parameter value of a specified quantity of persons is less than the specified threshold value, or a person quantity of the audience population package reaches the person quantity lower limit of the audience population package.

9. The method according to claim 1, wherein the specified threshold value is a sum of an average effect parameter value of a specified quantity of audiences for the target network media information within a specified time range and a specified increase amount.

10. The method according to claim 1, wherein the effect parameter comprises: a click-through rate or a conversion rate.

11. A system for processing network media information, comprising a memory, a processor coupled to the memory and a plurality of program units stored in the memory to be executed by the processor, wherein the system comprises:

a collection apparatus, configured to collect historical distribution effect data of network media information;

an attribute improvement apparatus, configured to acquire population attribute data and network media information management data, and perform attribute improvement processing on the historical distribution effect data by using the population attribute data and the network media information management data to obtain characteristic attribute data;

an estimation model apparatus, configured to construct an effect parameter estimation model corresponding to each attribute of the characteristic attribute data, and train the effect parameter estimation model according to the historical distribution effect data;

an effect parameter estimation apparatus, configured to estimate an effect parameter value of each audience for target network media information according to the effect parameter estimation model; and an extraction apparatus, configured to sequentially select, from the audiences, an audience whose estimated effect parameter value is greater than or equal to a specified threshold value to form an audience population package to be extracted, such that by automatically computing the estimated effect parameter value, the audience population package is automatically extracted without manual adjustment and precision of distribution of the network media information in the audience population package is improved.

12. The system according to claim 11, wherein the effect parameter estimation apparatus is further configured to receive an industrial classification label, and the target network media information is network media information correspondingly obtained by performing classification according to the received industrial classification label.

13. The system according to claim 11, wherein the attribute improvement apparatus is specifically configured to search the population attribute data and the network media information management data according to a key attribute field in the distribution effect data to obtain a corresponding related attribute field, add the related attribute field to the distribution effect data corresponding to the key attribute field, and form the key attribute field and the related attribute field into the characteristic attribute data.

14. The system according to claim 11, wherein the estimation model apparatus is specifically configured to:

construct a logistic regression model of each attribute of the characteristic attribute data by using logistic regression, and use the logistic regression model as the effect parameter estimation model, wherein the logistic regression model specifically comprises:

a regression part complying with formula (1):

$$z = f(x_1, x_2, x_3, \ldots, x_i) = a_1 * x_1 + a_2 * x_2 + a_3 * x_3 + \ldots + a_i * x_i + d \quad (1)$$

a logical part complying with formula (2):

$$g(z) = \frac{1}{1 + e^{-z}} \quad (2)$$

wherein $z = f(x_1, x_2, x_3, \ldots, x_i)$, $x_1, x_2, x_3, \ldots, x_i$ are attributes in the characteristic data, $x_i$ is an $i^{th}$ attribute, $a_1, a_2, a_3, \ldots, a_i$ are weight coefficients corresponding to the attributes, $a_i$ is a weight coefficient corresponding to $x_i$, $g(z)$ is a corresponding effect parameter, and d is a parameter to be evaluated;

collect each attribute combination involved in network media information impression data and an effect parameter corresponding to each attribute combination;

substitute an attribute in each attribute combination into the right side of the equals sign of formula (1) in the foregoing, wherein if the attribute $x_i$ appears in the attribute combination, the value of $x_i$ is 1, or if the attribute $x_i$ does not appear in the attribute combination, the value of $x_i$ is 0; substitute the effect parameter (for example, a click-through rate) corresponding to the attribute combination into formula (2) to obtain z, wherein $z = f(x_1, x_2, x_3, \ldots, x_i)$; and substitute $f(x_1, x_2, x_3, \ldots, x_i)$ into formula (1) to obtain logistic regression training of the attribute combination and the corresponding effect parameter; and solve $a_1, a_2, a_3, \ldots, a_i$ in formula (1) by using logistic regression training obtained for each attribute combination, so as to obtain the weight coefficient of each attribute in the effect parameter estimation model.

15. The system according to claim 14, wherein the effect parameter estimation apparatus is specifically configured to:

perform the following operations on each audience in a specified range:

substitute the weight coefficient of each attribute in the effect parameter estimation model into formula (1) in the foregoing; then determine whether each attribute in the attributes $x_1, x_2, x_3, \ldots, x_i$ appears in an attribute of the audience and an attribute of the target network media information, wherein if yes, the value of the attribute is 1, or otherwise, the value of the attribute is 0; substitute the value of each attribute into formula (1) to obtain corresponding $f(x_1, x_2, x_3, \ldots, x_i)=z$; and substitute z into formula (2), wherein an obtained g(z) is an effect parameter value of the audience for the target network media information.

16. The system according to claim 11, wherein the extraction apparatus is specifically configured to select, starting from an audience whose estimated effect parameter value is the highest, from audiences arranged in a descending order of estimated effect parameter values; add the audience to the audience population package when the estimated effect parameter value of the audience is greater than or equal to the specified threshold value; and output the audience population package when the estimated effect parameter value of the audience is less than the specified threshold value, or a person quantity of the audience population package reaches a preset person quantity lower limit of the audience population package.

17. The system according to claim 11, wherein the extraction apparatus is specifically configured to compute, starting from an audience whose estimated effect parameter value is the highest, for every specified person quantity, an average effect parameter value of all users that are from audiences arranged in a descending order of estimated effect parameter values and rank higher than a selected user; compare the average effect parameter value of the specified quantity of persons with the specified threshold value; add an audience of the specified person quantity to the audience population package if the average effect parameter value of the specified quantity of persons is greater than or equal to the specified threshold value; and output the audience population package when an average effect parameter value of a specified quantity of persons is less than the specified threshold value, or a person quantity of the audience population package reaches a person quantity lower limit of the audience population package.

18. The system according to claim 11, wherein the specified threshold value is a sum of an average effect parameter value of a specified quantity of audiences for the target network media information within a specified time range and a specified increase amount.

* * * * *